Feb. 4, 1936.   C. O. BALL   2,029,303
APPARATUS FOR AND METHOD OF CANNING
Filed Aug. 27, 1930
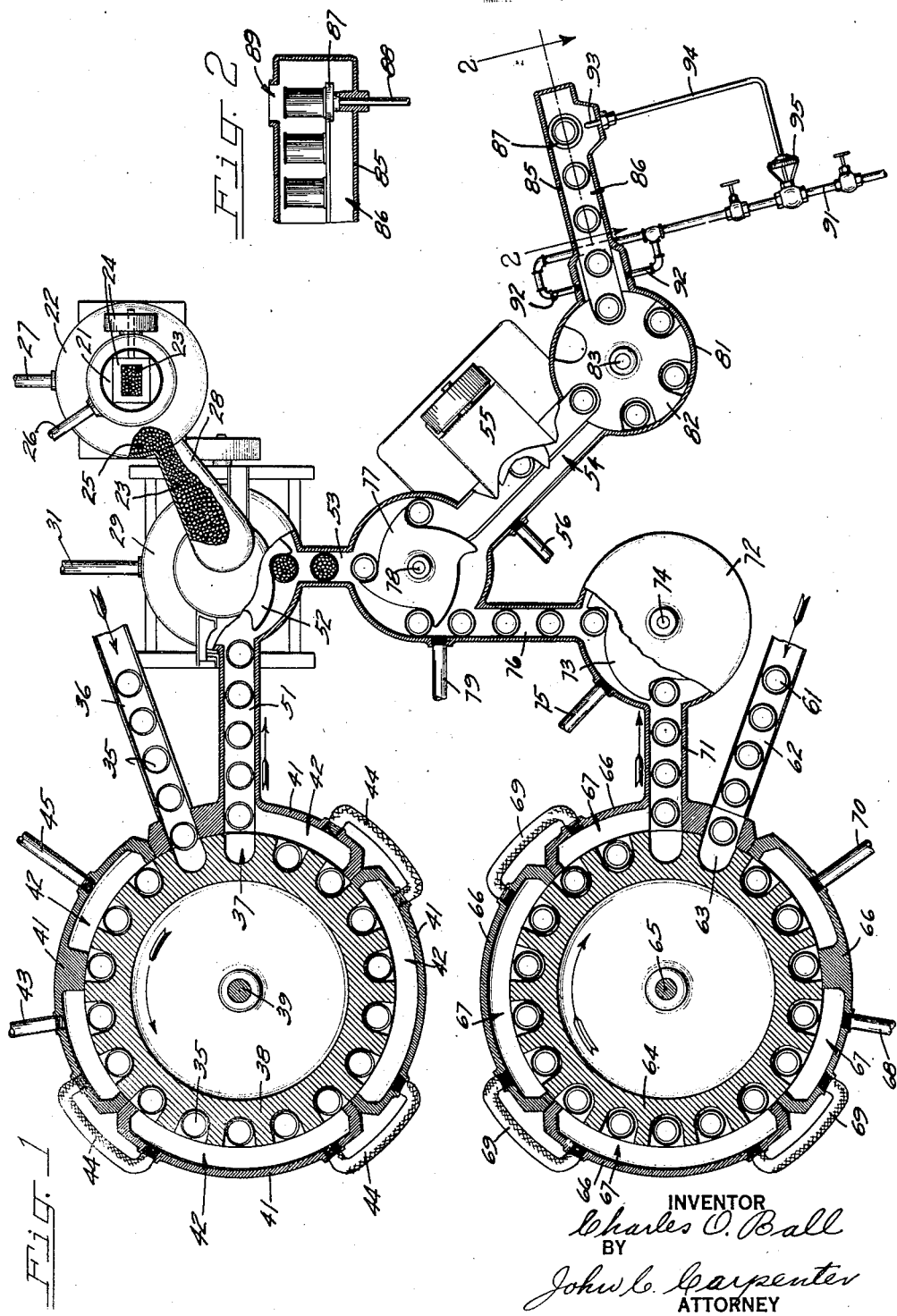
INVENTOR
Charles O. Ball
BY
John C. Carpenter
ATTORNEY Patented Feb. 4, 1936

2,029,303

UNITED STATES PATENT OFFICE 2,029,303

APPARATUS FOR AND METHOD OF CANNING

Charles O. Ball, River Forest, Ill., assignor to American Can Company, New York, N. Y., a corporation of New Jersey Application August 27, 1930, Serial No. 478,071

3 Claims. (Cl. 99—8)

The present invention relates in general to an improved method of canning and has particular reference to filling and sealing a product in a can by a series of interconnected operations carried on under sterile conditions.

The principal object of the present invention is the provision of a method of canning wherein a product is sterilized and introduced into a sterilized can which is hermetically sealed with a sterilized cover, all of the operations taking place under fully sterile conditions.

An important object of the invention is the provision of a recess or method of canning which may be carried on continuously and through the employment of a series of associated operations carried on in interconnected sterile or aseptic chambers.

An important object of the invention is the provision of a method for filling a product in a can and hermetically sealing the same while subjecting the can parts and the product to a sterilizing medium, carried on under completely sterile conditions.

Numerous other objects of the invention will be apparent as it is better understood from the following description, which, taken in connection with the accompanying drawing, discloses a preferred embodiment thereof.

Referring to the drawing:—

Figure 1 is a schematic view illustrating a series of interconnected mechanisms for performing the various steps of the present invention.

Fig. 2 is a schematic sectional view of a portion of a discharging apparatus being taken substantially along line 2—2 in Fig. 1.

The invention contemplates the passage of a food product or the like into a sterilizing chamber which may be maintained sterile by live steam or other suitable sterilizing agency. From this chamber the sterile product passes into a sterilized filling machine. At the same time empty cans are introduced into a sterilizing apparatus which preferably passes them through a series of steam chambers during which time they are sterilized.

The sterilized can is thence introduced into the filling chamber of the filling machine and is filled with the sterilized product. The connecting passageways between the food sterilizer and between the can sterilizer and filling chamber prevent any contact with the atmosphere or contamination to either the can or its contents. The filled and sterilized can and product is thence transferred into a sterilized chamber of a can closing machine along a passageway shut off from any contaminating influence of the atmosphere.

Simultaneously with the aforesaid operations, can covers are introduced into a sterilizing apparatus, which preferably conveys them through a series of steam chambers during which time they are sterilized and from this sterilizing apparatus they are or may be subjected to a cooling operation in a closed chamber and under sterilized conditions. This cooling step, when utilized, extracts the heat obtained from the steam in the cover sterilizer, after which, the sterilized and cooled covers are introduced into the can closing chamber. This passage of sterilized covers from the sterilizing apparatus through the cooling apparatus and into the closing machine takes place along passageways shut off from any contaminating influence of the atmosphere.

A closing machine in the sterilized closing chamber positions the sterilized covers on to the sterilized cans and hermetically seals the sterilized product therein. The sealed cans are removed by a discharging mechanism operating in a sterilized chamber maintained sterile up to the point of discharge from the apparatus. This discharge mechanism prevents contamination to the can closing machine chamber and other aseptic chambers and passageways of the apparatus.

For the purpose of more clearly illustrating the various steps of the present invention, the drawing represents the principal parts of a mechanism or apparatus adapted to permit accomplishment of the various operations heretofore mentioned. The product is, or may be, first introduced into a hopper 21 of a product sterilizing apparatus 22. The product being canned, designated by the numeral 23, is passed through the hopper by a suitable feeding device 24 which discharges it into a sterilizing chamber 25 enclosing parts of the sterilizing apparatus.

Steam is preferably introduced into both the hopper section and the sterilizing chamber in any suitable manner as by means of steam pipes 26 and 27 conducting live steam from any suitable source. Sterilizing chamber 25 is connected by a passageway 28 to the filling chamber of a filling apparatus 29 and live steam is preferably continuously introduced into the latter chamber through a steam pipe 31.

While the foregoing operations are taking place, open-ended cans 35 are conveyed along a runway 36 and pass into one of a plurality of pockets 37 of a rotary valve 38 mounted on a vertical shaft 39. This valve member constitutes the movable element of a can sterilizing apparatus and is surrounded by a hollow casing or series of casings 41 which encloses a series of steam chambers 42 receiving live steam through pipe 43. The steam chambers 42 are preferably interconnected by means of pipes 44. During the rotation of the valve 38 in the direction of the arrow, the cans are successively carried through the various steam chambers and upon completion of one rotation of the valve, the cans carried thereby are sterilized.

The sterilized cans are thence transferred from the valve pockets of the sterilizer and through a passageway 51 which connects with the filling chamber of the filling apparatus 29. Each can upon reaching the filling chamber is engaged by a starwheel 52 which moves it through the filling chamber, bringing it into filling position to receive a charge of the product 23. This filling of the can in the sterile filling chamber takes place under completely sterilized conditions, the walls of the chamber completely enclosing the apparatus and preventing any contamination from the outside.

The filled sterilized can, with its sterilized product, is thence transferred through a passageway 53 and by means of a starwheel into a chamber 54 associated with a can closing machine 55. This chamber is also under fully sterile conditions. This sterile condition may be maintained by introduction of live steam through a pipe 56, or other sterile medium may be introduced into the chamber, it being only necessary to prevent entrance of any contaminating atmosphere since the chamber and the can and product passing therethrough are already fully sterilized.

While the foregoing operations are taking place, can covers 71 are advanced through a runway 62 and positioned successively into a plurality of pockets 63 of a valve member 64 mounted on a vertical shaft 65. This valve constitutes a movable element in a can cover sterilizing apparatus. The valve 64 is continuously rotated in the direction of the arrow and is completely enclosed by a casing or a series of casings 66 inside of which is located a series of steam chambers 67. Live steam is or may be introduced into the chambers through steam pipes 68, the chambers being interconnected by other pipes 69. As the can covers carried by the rotating valve member 64 are carried through the sterilizing apparatus, they are subjected to the action of steam in the various steam chambers 67 and when a can cover has been carried through one rotation of travel by the valve member 64, it is in a sterilized condition.

The sterilized can covers are thence removed through a passageway 71 and positioned into a chamber enclosed in a can cooling apparatus 72. The can covers pass from the passageway 71 into a pocket of a starwheel 73 mounted on a vertical shaft 74. This starwheel carries the covers through the cooling chamber of the cooling apparatus. Sterile water or other cooling media is or may be introduced into the chamber through a pipe 75.

The step of cooling of a can cover after sterilizing may, in some cases, be dispensed with but where a plastic sealing compound is used in the covers as gasket material for forming an hermetic seal between cover and can, it is desirable that the can cover be cooled prior to its introduction into the closing chamber. It is the heat of the steam used in the sterilizer that is extracted in this manner.

The sterilized and cooled covers 61 are then transferred from the cooling apparatus 72 through a passageway 76 and are brought into one of a series of pockets of a starwheel 77 mounted on a vertical shaft 78. This same shaft may carry a similar starwheel for the cans, as previously referred to. The starwheel 77 preferably conveys the can covers to a position in axial alignment with the filled cans and may assemble the two loosely together. In such case the filled cans with their loosely applied covers pass into the closing chamber 54. Live steam may be introduced into the chamber surrounding the starwheel 77 through a steam pipe 79, or other sterile medium may be used since the chamber and the can, cover and product passing therethrough are already fully sterilized.

The filled and sterilized can, with its superimposed sterilized cover is then united in the sterile closing chamber 54 in any suitable or preferred manner by the closing mechanism 55. Such uniting of the can cover to the can must provide a hermetically sealed can so as to prevent subsequent contamination.

The hermetically sealed can is thence removed from the sealing chamber by a discharge valve operating in a casing 81. This valve comprises a multiple pocket turret 82 mounted on a vertical shaft 83, the hermetically sealed can passing into one of the pockets and being conveyed by the valve into a discharge chamber.

The casing 81 is connected with an elongated housing 85 which encloses the discharge chamber designated by the numeral 86, through which the cans pass from the valve 82 to a discharge plunger 87 carried on the upper end of a sliding rod 88. The chamber 86 is filled with live steam or other sterile medium which constantly sweeps out the chamber by escaping through a discharge opening 89 formed in the housing 85. The discharge chamber 86 thus prevents entrance of air or other bacteria carrying medium into the discharge valve 82 and thus maintains a sterile condition in the apparatus.

Steam, when used as the sterile medium, is introduced into the discharge chamber 86 through a steam pipe 91 and through pipes 92 leading into both sides of the housing 85. The cans, upon being brought successively onto the plunger 87 are lifted therewith by a periodic raising of the rod 88 which carries the cans through the discharge opening 89 and out of the apparatus.

The amount of steam or other internal pressure maintained in the discharge chamber 86 is preferably regulated to a predetermined pressure which is controlled by a thermostatic device 93 projecting into the chamber 86 and connecting by a pipe 94 with a pressure or temperature regulator 85 controlling the passage of the steam through the pipe 91. By means of such regulation, a constant predetermined flow of the steam or other medium issues from the discharge chamber and air or other bacteria carrying medium is effectively prevented from entering into the valve 82 or into the rest of the apparatus. A similar condition of excess internal pressure will also obtain in connection with the chambers of the filling, cooling and closing mechanisms so that should any leaks take place relative to these chambers, there will always be an outward and not an inward flow of atmosphere.

It has been found advisable to connect the sterilizing chambers of the can and of the cover sterilizing apparatus with sources of vacuum in order to assist in removing air from the pockets of the respective valve members 38 and 64 as they pass to the sterilizing chambers and this is preferably accomplished through vacuum pipes 46 and 70 threadedly secured into the respective casings 41 and 66.

It will be seen from the foregoing description that after the product, the can, and its cover, have been severally sterilized there is no opportunity for subsequent contamination and the completely sterilized product, hermetically sealed in the can, is only brought into the atmosphere after it has been completely sealed. Furthermore, the apparatus is protected against entrance of air or other bacteria carrying medium at all points.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. An apparatus for canning, comprising separate sealed sterilizing chambers respectively for a product to be canned, the can bodies to receive the product, can ends to be seamed to the filled cans, and sealed sterile passageways between said chambers, and rotary sealing valves for the entrance of cans to be filled and for the exit of filled cans, and for the sealing of all of said chambers so as to maintain a pressure of confined live steam in said chambers.

2. An apparatus for canning, which comprises separate sealed sterilizing chambers for the product to be canned, the can bodies to receive the product, can ends to close the bodies after filling, and a sealed sterile chamber for containing the bodies as the ends are applied, and rotary sealing valves for the entrance of cans to be filled and for the exit of filled cans, and for the sealing of all of said chambers so as to maintain a pressure of confined live steam in said chambers.

3. A method of canning which comprises, passing a product to be canned into a sterilizing chamber, passing a can into a vacuumized chamber and thence into a second sterilizing chamber, passing a can cover into a separate vacuumized chamber and thence into a third sterilizing chamber, transferring the sterilized can into a sterile filling chamber, transferring the sterilized product into said filling chamber, filling the product into the can while in said filling chamber, transferring the filled can into a sterile can closing chamber, transferring the sterilized can cover into said closing chamber and hermetically uniting the sterilized cover with the filled sterilized can, and maintaining a pressure of confined live steam about the product and the can parts in said sterilizing chamber until the cans are hermetically closed, the intercommunication between the sterilizing chambers and the filling and closing chambers being sealed by the pressure of said confined steam against entrance of exterior atmosphere to prevent contamination of the can parts or product passing therethrough while maintaining a sterile medium in the various chambers.

CHARLES O. BALL.